(12) United States Patent
Kudo et al.

(10) Patent No.: US 10,270,257 B2
(45) Date of Patent: Apr. 23, 2019

(54) ELECTRIC POWER MANAGEMENT SYSTEM AND ELECTRIC POWER MANAGEMENT METHOD

(71) Applicants: Koji Kudo, Tokyo (JP); Hisato Sakuma, Tokyo (JP); Hitoshi Yano, Tokyo (JP)

(72) Inventors: Koji Kudo, Tokyo (JP); Hisato Sakuma, Tokyo (JP); Hitoshi Yano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 193 days.

(21) Appl. No.: 15/216,012

(22) Filed: Jul. 21, 2016

(65) Prior Publication Data

US 2016/0329717 A1     Nov. 10, 2016

Related U.S. Application Data

(63) Continuation of application No. 13/982,408, filed as application No. PCT/JP2011/076291 on Nov. 15, 2011, now Pat. No. 9,423,849.

(30) Foreign Application Priority Data

Jan. 31, 2011   (JP) ................................. 2011-018322

(51) Int. Cl.
*G06F 1/26*   (2006.01)
*G06F 1/32*   (2019.01)
(Continued)

(52) U.S. Cl.
CPC .............. *H02J 3/383* (2013.01); *G06F 1/266* (2013.01); *G06F 1/3203* (2013.01); *H02J 3/46* (2013.01)

(58) Field of Classification Search
CPC .. H02J 3/383; H02J 3/46; G06F 1/266; G06F 1/3203; Y02E 10/563; Y02E 10/566; Y10T 307/305; Y10T 307/352
(Continued)

(56) References Cited

U.S. PATENT DOCUMENTS

| 4,636,931 A | 1/1987 | Takahashi |
|---|---|---|
| 7,698,219 B2 | 4/2010 | Kremen |

(Continued)

FOREIGN PATENT DOCUMENTS

| EP | 2535999 A1 | 12/2012 |
|---|---|---|
| JP | 2003-289627 A | 10/2003 |

(Continued)

OTHER PUBLICATIONS

Communication dated Dec. 7, 2016, from the European Patent Office in counterpart European Application No. 11857508.3.

*Primary Examiner* — Hal Kaplan
(74) *Attorney, Agent, or Firm* — Sughrue Mion, PLLC

(57) ABSTRACT

The HEMS of each consumer transmits the amount of surplus electricity that is expected by to be generated by a PV system, and/or the amount of electric power that is needed by a controllable load, in a predetermined time slot on a predetermined date, to a server apparatus. The server apparatus, based on the notified amount of surplus electricity and the amount of electric power that is needed by the controllable load, combines a first consumer and a second consumer so that the amount of electric power needed by the controllable load will be equal to or greater than the amount of surplus electricity. Then, under the control the HEMS of the second consumer, the surplus electricity that is generated by the first consumer is consumed by each controllable load.

15 Claims, 3 Drawing Sheets

(51) Int. Cl.
*H02J 3/38* (2006.01)
*H02J 3/46* (2006.01)
*G06F 1/3203* (2019.01)

(58) Field of Classification Search
USPC .................................... 307/18, 24; 700/295
See application file for complete search history.

(56) References Cited

U.S. PATENT DOCUMENTS

| | | |
|---|---|---|
| 8,352,091 B2 | 1/2013 | Haugh |
| 2005/0165512 A1 | 7/2005 | Peljto |
| 2007/0271006 A1 | 11/2007 | Golden et al. |
| 2008/0046387 A1 | 2/2008 | Gopal |
| 2009/0265042 A1* | 10/2009 | Mollenkopf ............... H02J 3/12 700/298 |
| 2010/0023174 A1 | 1/2010 | Nagata et al. |
| 2010/0174418 A1 | 7/2010 | Haugh |
| 2011/0060474 A1 | 3/2011 | Schmiegel |
| 2011/0185196 A1 | 7/2011 | Asano |
| 2012/0109389 A1 | 5/2012 | Covaro |
| 2012/0233094 A1 | 9/2012 | Mise |
| 2013/0007458 A1 | 1/2013 | Wakita |

FOREIGN PATENT DOCUMENTS

| | | |
|---|---|---|
| JP | 2006-288162 A | 10/2006 |
| JP | 2007-267600 A | 10/2007 |
| JP | 2007-295680 A | 11/2007 |
| JP | 2008-125290 A | 5/2008 |
| JP | 2008-125295 A | 5/2008 |
| JP | 2009-284586 A | 12/2009 |
| JP | 2010-220352 A | 9/2010 |
| WO | 2008/117392 A1 | 10/2008 |

\* cited by examiner

ELECTRIC POWER MANAGEMENT SYSTEM AND ELECTRIC POWER MANAGEMENT METHOD

CROSS REFERENCE TO RELATED APPLICATIONS

This application is a Continuation application of U.S. application Ser. No. 13/982,408, filed Jul. 29, 2013, which is a National Stage of International Application No. PCT/JP2011/076291, filed on Nov. 15, 2011, which claims priority from Japanese Patent Application No. 2011-018322, filed on Jan. 31, 2011, the contents of which are incorporated herein by reference in their entirety.

TECHNICAL FIELD

The present invention relates to an electric power management system and an electric power management method for managing an electric power system to which a photovoltaic (PV: Photovoltaic) system is connected.

BACKGROUND ART

The so called environment and energy problem have become widely recognized due to actual evidence of global warming resulting from carbon dioxide emissions, due to peak oil theory and due to energy security problem caused by the growth of developing and middle developed countries.

In order to realize a sustainable society, mass spreading of photovoltaic generation, wind power generation and other renewable electric power generation has gained trends throughout the world. However, increase of renewable electric supply systems, in particular, the widespread introduction of PV systems causes "surplus electricity issue", which begins to be recognized as an emerging problem, and measures against this problem are needed.

The surplus electricity issue is the problem in which many consumers who has a PV system cannot make full use of the generated power from the PV system sell surplus electricity to the electric power company, resulting in an excessive power supply in the total electric power system. In the prior art, if surplus electricity from electric power generation of a PV system is generated, the amount of electric power that is generated is controlled by controllable power generation facilities such as thermal power plants and the like to thereby optimize the electric power supply in the electric power system and balance the power supply with the amount of electric power that is needed. However, if, in the future, PV systems spread on a large scale, the amount of surplus electricity is expected to exceed the regulating capacity of the thermal power plants etc., and it is recognized that at worst, an imbalance between power supply and demand will lead to power failure, causing a serious problem.

Various kinds of methods have been conventionally investigated, as measures to resolve this surplus electricity issue. For example, these are some known methods: (1) a method to prevent the PV system from generating electric power at a specific date and time (e.g., 11 a.m. to 3 p.m. in the day of the early-May holiday season in Japan) during which of power consumption is low, based on the calendar; (2) a method to prevent multiple PV systems from generating electric power at the same time by sending a control signal using FM broadcasting; (3) a scheduling method that prevents a PV system, in advance, from generating electric power in the power conditioner (PCS) equipped in the PV system; and the like.

However, all of these methods are to avoid the occurrence of surplus electricity by preventing the amount of electric power generated by the PV system, aiming at a technique for operating the PV system at a power level equal to or lower than its power generation capability. This is a waste of the power generation capability of the PV system, and this is not an efficient method for using a PV system that is to be introduced for the purpose of realizing a sustainable society.

For this reason, another technique has been researched in which electric power is consumed by the user such that the electric power generated by the PV system does not cause reverse power flow at the moment when the PV system initiates control to prevent the generation of electric power.

In general, however, surplus electricity is generated at a time when consumer requirements for electricity are low for facilities equipped with the PV system, and the consumer may be forced to use electricity that he/she does not need and there is concern that this inconvenience may alienate consumers.

Further, patent document 1, for example, proposes a control method of charging and discharging for efficiently storing surplus electricity to the storage battery of the consumer. However, the storage battery is still expensive at present, and it is conceivable that spread of a sufficient number of storage batteries or storage batteries having high enough capacity to solve the above surplus electricity issue will take a considerable time.

Though it is not a technique to present a solution to the surplus electricity problem, patent document 2 discloses an electric power system having a low-voltage system to which the consumers that are equipped with the distributed generator is connected, and a high-voltage system to which the low-voltage system is connected. Patent document 2 discloses that the low-voltage system is separated from the high-voltage system when a problem occurs in the high-voltage system, and that the electric power generated by the distributed generators is shared between the consumers in the low-voltage system.

Of the above-described electric power systems in the background art, the technique that avoids generation of surplus electricity by preventing electric power generation in the PV system is the same as eliminating green electric power generated by the PV system, and this is not an efficient method for using a PV system that is to be introduced for the purpose of realizing a sustainable society.

Further, the technique in which electric power is consumed by the user at the moment when the PV system initiates control to prevent the generation of electric power, the consumer may be forced to use electricity that he/she does not need and there is concern that this inconvenience may alienate consumers.

Moreover, the technique for storing surplus electricity in a storage battery as described in patent document 1 requires consumers to have both a PV system and a storage battery, so that the technique is costly for the consumers.

RELATED ART DOCUMENTS

Patent Document

Patent Document 1: Japanese Patent Laid-Open No. 2009-284586
Patent Document 2: Japanese Patent Laid-Open No. 2008-125290

SUMMARY

It is therefore an object of the present invention to provide a power control system and an electric power management method which contribute to solving the surplus electricity problem in an electric power system with a photovoltaic system connected thereto.

In order to achieve the above object, the electric power management system according to an exemplary aspect of the present invention is an electric power management system for managing an electric power system having, at least, one or more first consumers having a photovoltaic system, and at least, one or more second consumers having a controllable load, connected thereto, and is constructed such that the first consumer and the second consumer include a consumer energy management system for controlling the amount of electric power generated by the photovoltaic system and/or for controlling the controllable load, the electric power management system includes a server apparatus that is connected to the consumer energy management systems so as to be able to exchange data via a network, the server apparatus, based on the amount of surplus electricity that is expected to be generated in a predetermined time slot on a predetermined date on which surplus electricity of the photovoltaic system is expected to be generated and based on the expected amount of electric power that the second consumer needs in the predetermined time slot on the predetermined date, which are notified from the consumer energy management systems, combines the first consumer and the second consumer so that the amount of electric power needed by the second consumer in the predetermined time slot on the predetermined date will be equal to or greater than the amount of surplus electricity generated at the first consumer, and makes the controllable load consume the surplus electricity generated at the first consumer by controlling the consumer energy management system of the second consumer.

The electric power management method according to an exemplary aspect of the present invention is an electric power management method for managing an electric power system having, at least, one or more first consumers having a photovoltaic system, and at least, one or more second consumers having a controllable load, connected thereto, is implemented such that a consumer energy management system equipped for the first consumer to control the amount of electric power that is generated by the photovoltaic system and/or to control the controllable load, notifies the amount of surplus electricity that is expected to be generated in a predetermined time slot on a predetermined date on which surplus electricity of the photovoltaic system to a server apparatus, wherein, a consumer energy management system equipped for the second consumer notifies the amount of electric power that is expected to be needed by the second consumer in the predetermined time slot on the predetermined date to the server apparatus, wherein, the server apparatus, based on the amount of surplus electricity that is expected to be generated in a predetermined time slot on a predetermined date on which surplus electricity of the photovoltaic system is expected to be generated and based on the expected amount of electric power that the second consumer needs in the predetermined time slot on the predetermined date, which are notified from the consumer energy management systems, combines the first consumer and the second consumer so that the amount of electric power needed by the second consumer in the predetermined time slot on the predetermined date will be equal to or greater than the amount of surplus electricity generated at the first consumer, and makes the controllable load consume the surplus electricity generated at the first consumer by controlling the consumer energy management system of the second consumer.

EXEMPLARY EMBODIMENT

Figure 1:
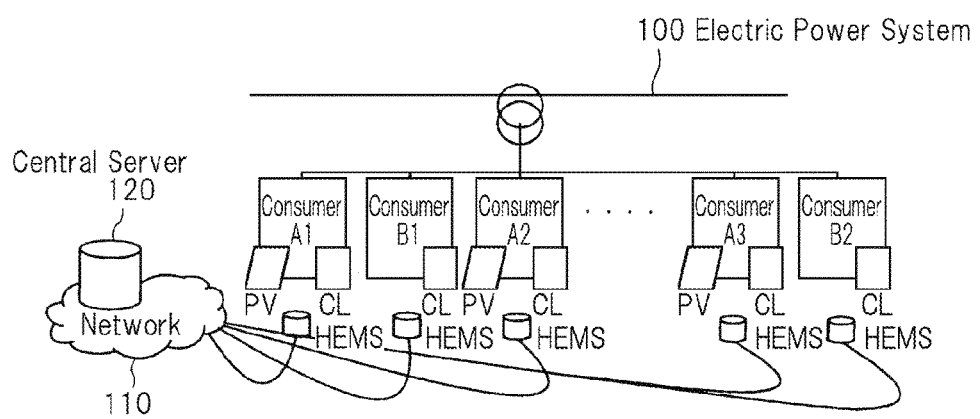
FIG. 1 is a block diagram showing one configurational example of an electric power system of the present invention.

Next, the present invention will be described with reference to the drawings.

In the electric power management system of the present invention, consumers (first consumers) An (n is a positive integer) having a PV system and consumers (second consumers) Bn (n is a positive integer) having a controllable load are combined so that surplus electricity from the PV systems of consumers An is consumed by the controllable loads of combined consumers Bn. The most simple example of a combination is to combine consumers An and Bn that are to be operated in cooperation on a one-to-one, Combination of consumer An and consumer Bn is designated based on the amount of surplus electricity expected to be generated in consumer An in a predetermined time slot on a predetermined date on which surplus electricity of the PV system is expected to be generated and the expected amount of power needed by the controllable load of consumer Bn and assured in the predetermined time slot of the predetermined date so that the amount of surplus electricity will become equal to the amount of power needed by the controllable load or that the amount of power needed by the controllable load will be greater than the amount of surplus electricity. When consumer Bn has a PV system, the combination with consumer An may and should be determined based on the amount of power needed by consumer Bn (=the amount of electric power needed by the controllable load− the amount of electric power generated by the PV system). In the following description, to make the description simple, it is assumed that consumer Bb has no PV system but only has a controllable load.

The reason that combination of consumer An and consumer Bn is determined based on the expected amount of surplus electricity of consumer An that is to be generated and the expected amount of power needed by the controllable load of consumer Bn in a predetermined time slot on a predetermined date, is to avoid forcible consumption of power such as excessively consuming power by consumer An alone in order to use up surplus electricity to assure QOL (Quality of Life).

Also, determination of combination of consumer An and consumer Bn based on the expected amount of surplus electricity of consumer An and the expected amount of power needed by the controllable load of consumer Bn in a predetermined time slot on a predetermined date, makes it possible for the system operator such as an electric power company that manages the entire electric power system to precisely predict the power requirements in the entire system based on the clusters of combined consumers (consumers An, Bn), hence, the power company can prepare the controllable power generation facilities (such as a thermal power plant etc.) thereof in accordance with the expected needs of electric power. Further, on that day (the aforementioned predetermined date), other consumers An and Bn may be added or omitted in order to satisfy the relation: the amount of electricity generated by the PV system≤the amount of electric power that is needed, so that control over the supply-demand balance in the entire electric power system can be made simple.

The amount of surplus electricity generated by the PV system and the amount of electric power needed by the controllable load are calculated by a well-known HEMS (Home Energy Management System: Consumer energy management system) installed, for example at the consumer site and notified through a network to CEMS (Central Energy Management System: which will be referred to hereinbelow as central server) to which the HEMS of each consumer is connected. The central server selects consumers An and Bn to be operated in cooperation, from the amounts of surplus electricity in a predetermined time slot on a predetermined date, notified from consumers An and the amounts of power needed by the controllable loads, notified from consumers Bn. It is desirable that energy storage (ES: Energy Storage), such as, for example storage batteries and heat pump water heaters that can store electric and thermal energies, and the like, and storage batteries for electric vehicles, etc, is used as the controllable load. The electric power needs (the amount of electric power demanded by the controllable load) of consumer Bn may be declared via a bidding process for the amount of surplus electricity of consumer An that is expected to be generated.

FIG. 1 is a block diagram showing one configurational example of an electric power system of the present invention.

As shown in FIG. 1, the electric power system of the present invention includes, at least, one or more consumers An having a PV system, at least, one or more consumers Bn having a controllable load CL, and central server (server apparatus) 120 connected to consumers An and Bn so as to communicate with each of them via network 110.

Consumers An and Bn include an HEMS for controlling the amount of electric power generation by a PV system and/or a controllable load CL so that data is exchanged between central server 120 and the HEMS of each of consumers An and Bn via network 110 using wired communication means such as the well-known Internet, PCL (Power Line Communications), optical fibers, etc., or wireless communication means such as Zigbee, WiFi, WiMax and the like. Here, HEMS may employ any device as long as it can control the amount of electric power generated by the PV system and as long as it can control controllable load CL, and can exchange data with central server 120. For example, HEMS may be realized by an information processor (computer) or the like including an electric power sensor and well-known communicating functionality.

The PV system is a well-known electric power generation system including, for example, a PV panel for generating electricity using solar energy and a PCS (Power Conditioning System) that converts the d.c. power generated by the PV panel into a.c. power suited to electric power system 100 and supplies the a.c. power to a distribution line.

Controllable load CL is a device in which power consumption can be externally controlled and which can store energy like a heat pump water heater such as EcoCute etc., an electric vehicle, a plug-in hybrid electric vehicle, a stationary storage battery and the like. Controllable load CL may include electric power devices such as an automatic dishwasher, washing machine and the like, which are relatively unlikely to lose usefulness (lose QoL) if the device is not operated by consumer's intention.

Figure 2:
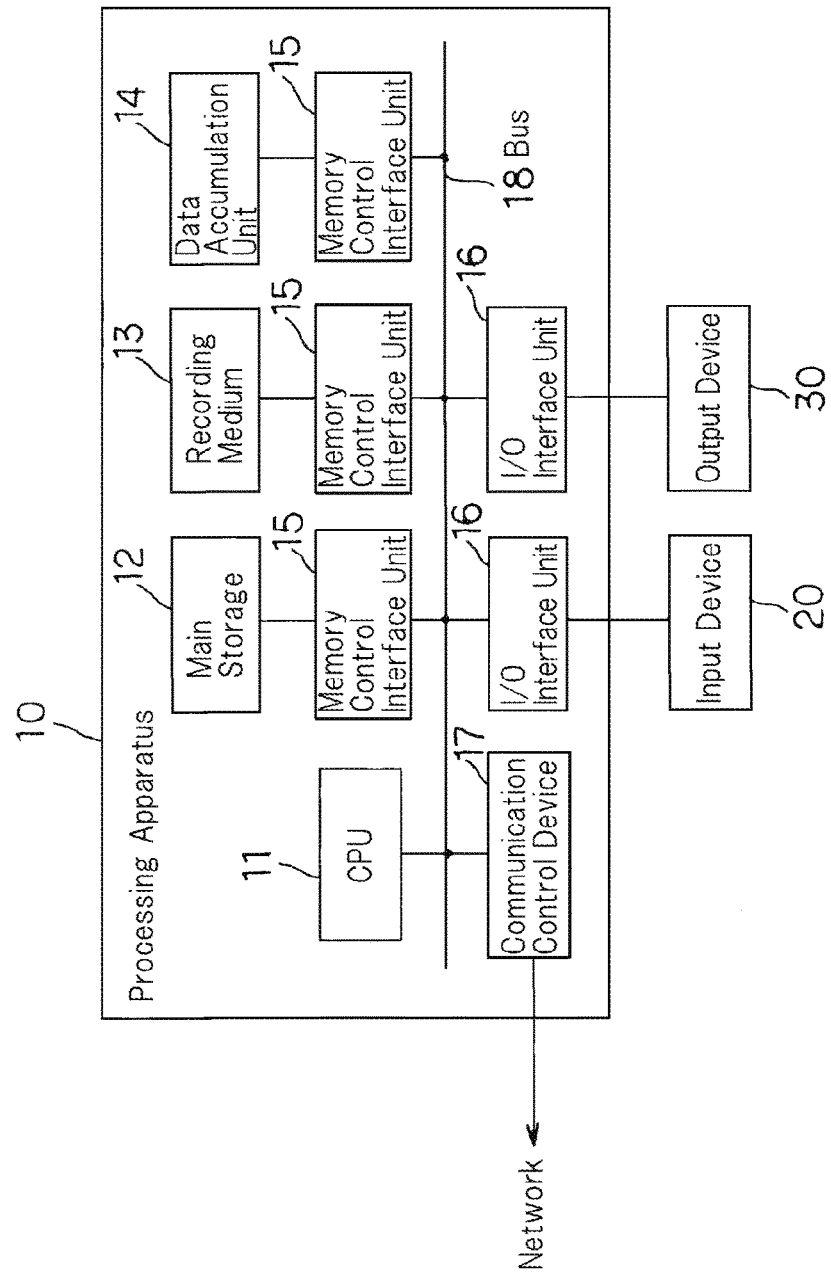
FIG. 2 is a block diagram showing one configurational example of a central server shown in FIG. 1.

Central server 120 can be realized by a computer shown in FIG. 2, for example.

The computer shown in FIG. 2 includes processing apparatus 10 for executing a predetermined process in accordance with a program, input device 20 for inputting a command, information, etc. to processing apparatus 10, and output device 30 for outputting the processed result from processing apparatus 10.

Processing apparatus 10 includes CPU 11, main storage 12 for temporarily storing information necessary for the process in CPU 11, recording medium 13 on which the program for executing the process of the present invention is recorded, data accumulation device 14 in which the aftermentioned power generation history data etc. is stored, memory control interface unit 15 for controlling data transfer between main storage 12, recording medium 13 and data accumulation device 14, I/O interface units 16 as interface devices for input device 20 and output device 30, and communication control device 17 for exchanging data with the HEMSs of consumers An and Bn, all these being connected by bus 18.

Processing apparatus 10 executes the aftermentioned process as central server 120, in accordance with the program recorded on recording medium 13. Recording medium 13 may be a magnetic disk, semiconductor memory, optical disk or any other recording medium. Data accumulation device 14 does not need to be provided inside processing apparatus 10 but may be given as a separate device.

Here, if the HEMS is realized by an information processing device, the information processing device can be realized by a configuration similar to the computer shown in FIG. 2, except using a different program.

Next, the electric power management method of the electric power system of the present invention will be described with reference to the drawings.

Figure 3:
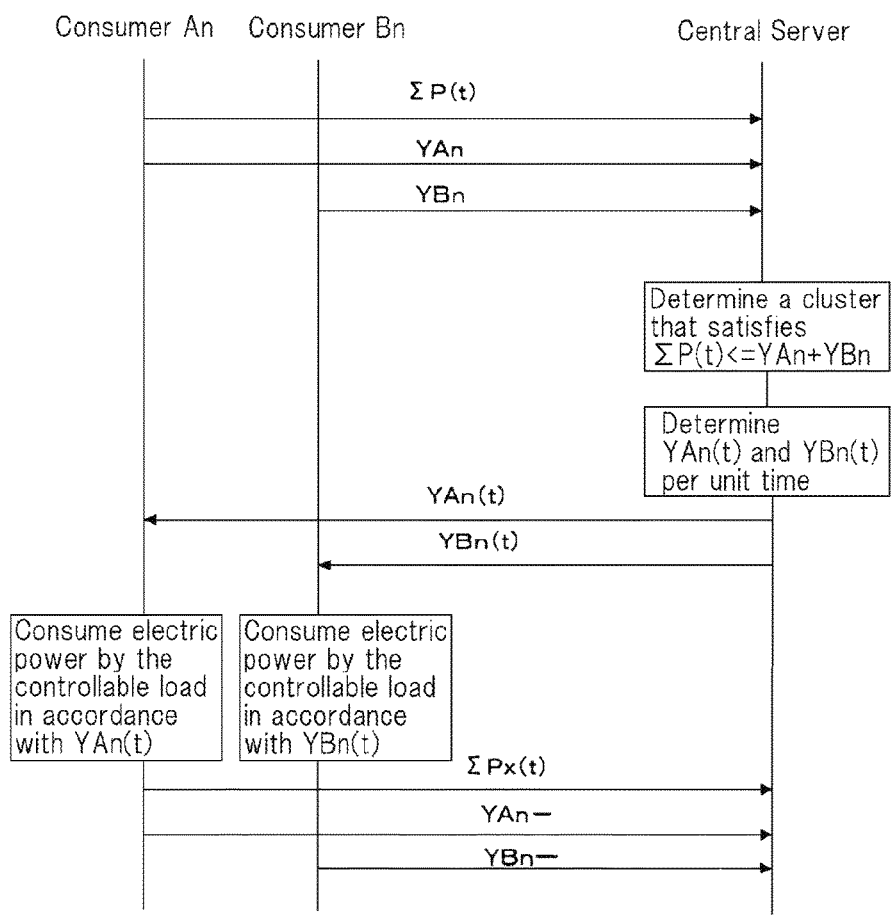
FIG. 3 is a sequence diagram showing the procedure of an electric power management method of the present invention.

FIG. 3 is a sequence diagram showing the procedure of the electric power management method of the present invention.

Here, FIG. 3 shows a state in which data is exchanged between one consumer cluster (a pair of consumer An and consumer Bn) and central server 120. However, in reality, central server 120 exchanges data with many consumer clusters.

The HEMS of consumer An measures the amount of electric power generated by the PV system every predetermined unit time and stores the measurements as power generation history data. This power generation history data may be stored in the HEMS of consumer An or may be stored in central server 120. The power generation history data may be stored in units of a day, a week, a month or the like. However, in view of the fact that one PV system has a lifetime of about 20 years, it is desirable that the data should be stored continually from the start of electric power generation by the PV system until the PV system is no longer usable. The aforementioned unit time is desirably set as short as possible taking into account that the amount of power generated by the PV system varies depending upon the weather. However, since the shorter the unit time the more frequent the data should be collected, which results in a large amount of data, in order to follow the rules on balancing the electric power system 100, the unit time should be set as short as one minute at a minimum, and may be set as long as 30 minutes, for example. Here, it is preferable that the aforementioned power generation history data be stored in a corresponding manner to the sunshine data installed in a separate system (business purpose PV system or the like) collected on central server 120, based on the location of the consumer.

As shown in FIG. 3, the HEMS of consumer An, based on the past sunshine data and sunshine predicted data stored in central server 120 and the aforementioned power generation history data, calculates the expected amount of electric power generation $\Sigma P(t)$ in a predetermined time slot on a predetermined date at which generation of surplus electricity or prevention of electric power generated by the PV system is expected, and transmits the result to central server 120.

As a way to find the predetermined date and predetermined time slot in which preventing the generation of electric power can be expected, it is thought that an electric power company, a weather forecast agency, and a third agency, that each predict the amount of electric power that may be generated by the PV system or the like, will notify central server 120.

The HEMS of consumer An determines the amount of electric power $Y_{An}$ that is needed by controllable load CL of consumer An in the predetermined time slot on the predetermined date, before the aforementioned predetermined date, for example, on the previous day of the aforementioned predetermined date. Similarly, the HEMS of consumer Bn determines the amount of electric power $Y_{Bn}$ that is needed by controllable load CL of consumer Bn in the predetermined time slot on the predetermined date, on the previous day of the aforementioned predetermined date.

As to the amounts of demanded electric power $Y_{An}$ and $Y_{Bn}$, in order for consumer An and/or Bn not to be forced to use up hot water boiled by a heat pump water heater or not to be forced to drive the electric vehicle and thus reduce the amount of accumulated electricity on the storage battery so as to ensure the charging capacity by an electric vehicle, etc., each of the amounts of energy (the amount of electric power) storable in controllable loads CL is measured at a point of time T on the previous day after consumer An and Bn's bedtime, for example, to set up as the amount of electric power $Y_{An}$ and $Y_{Bn}$ that is needed by controllable loads CL in the predetermined time slot on the next day (the predetermined date). The HEMSs of consumers An and Bn respectively transmit the determined amount of electric power $Y_{An}$ and $Y_{Bn}$ that is needed to central server 120 via network 110.

Upon receiving the aforementioned $\Sigma P(t)$, $Y_{An}$ and $Y_{Bn}$ from each of the consumers, center server 120 selects consumer An and consumer Bn that satisfy the relation $\Sigma P(t) <= Y_{An} + Y_{Bn}$ to determine the combination (consumer cluster) of consumers An and Bn to be made to cooperate. In this case, it is preferable that consumer An and consumer Bn that are to be combined be selected within the consumers connected in the same pole transformer in order to minimize the transmission loss of the surplus electricity $(=\Sigma P(t) - Y_{An})$ from consumer An to consumer Bn.

There is another reason why the cluster is preferably formed of consumers connected to the same pole transformer. When surplus electricity is reverse flowed from consumer An to the pole transformer so that the electric power is used at consumer Bn located beyond the pole transformer, there is a risk of a new problem in which the reverse power flow from consumer An raises the distribution voltage above, and deviates from, the proper range (the proper range of the distribution voltage is $101 \pm 6V$ for the standard voltage of 100 V, and $202 \pm 20V$ for the standard voltage of 200 V in Japan). This new problem can also be solved by forming a cluster of consumers connected to the same pole transformer.

When it is impossible to select consumers An and Bn to be operated in cooperation, from those connected to the same pole transformer, central server 120 determines that a combination of consumers An and Bn be made to cooperate, from among those connected to the same distribution feeder line, as the second best combination. The distribution feeder line indicates a high-voltage power line for transmitting high-voltage power (e.g., 6.6 kV) output from the distribution transformer of a transformer substation.

When it is impossible to select consumers An and Bn that are to be operated in cooperation, from among those connected to either the same pole transformer or the same distribution feeder line, central server 120 may determine a combination of consumers An and Bn that are to be operated in cooperation, from among those connected to the same distribution transformer substation. Further, the server may determine a combination of consumers An and Bn that are to be operated in cooperation, from among those connected to the different distribution transformer substations. If the distance between the connection points of consumer An and consumer Bn is large, it cannot be said that electric power from consumer An will actually supplied to the combined consumer Bn, but balance between supply and demand may and should be coordinated in a wide area including the consumer cluster.

After determination of the combination (consumer cluster) of consumers An and Bn that are to be operated in cooperation, central server 120 prepares an expected pattern of electric power to be generated by the PV system of consumer An in the predetermined time slot on the aforementioned predetermined date, based on the aforementioned power generation history data of consumer An. The pattern of electric power that is expected to be generated is determined using, for example, the power generation history data in the predetermined time slot on the aforementioned predetermined date in the previous year, or the average of the power generation history data in the predetermined time slot in the past one week, or the like, taking into account the weather forecast and sunshine prediction in the predetermined time slot on the predetermined date. The final pattern of electric power that is expected to be generated may be created from a ratio $R(t)=P(t)/\Sigma P(t)$, the ratio of expected amount of electric power that is expected to be generated per unit time, $P(t)$, to the integrated value of the amount of electric power that is expected to be generated in the predetermined time slot, $\Sigma P(t)$.

Though the present exemplary embodiment was shown by taking an example where the pattern of power that is expected to be generated is prepared based on the power generation history data for every consumer An, the pattern of electric power that is expected to be generated may be prepared by other methods. For example, by referencing the prediction of electric power that is to be generated by the PV system on the aforementioned predetermined date, presented from the electric power company or the like, an electric power generation pattern similar to the referenced pattern (for example, in a case of a PV system having a power output of 3 kW, an electric power generation pattern having the same pattern form with its peak power adjusted to about 3 kW) may be used as a pattern of electric power that is expected to be generated by consumer An.

The pattern of electric power that is expected to be generated in the aforementioned predetermined time slot is used to prepare the pattern of the amount of stored electric (thermal) energy to be assigned per unit time to controllable load CL in the predetermined time slot on the aforementioned predetermined date.

Specifically, central server 120 determines the amount of stored electric (thermal) energy $Y_{An}(t)+Y_{Bn}(t)$ to be assigned per unit time to controllable CL whose total amount of stored electric (thermal) power in the predetermined time slot on the aforementioned date is the amount of electric power $Y_{An}$ and $Y_{Bn}$ that is needed by the controllable loads, each notified from the consumers. Here, $Y_{An}(t)+Y_{Bn}(t)$ is set to be equal to P(t) or greater than P(t). Then, central server 120 notifies the HEMS of consumer An of the amount of stored electric (thermal) power $Y_{An}(t)$ to be assigned per unit time to controllable load CL in the predetermined time slot on the aforementioned predetermined date and notifies the HEMS of consumer Bn of the amount of stored electric (thermal) power $Y_{Bn}(t)$ to be assigned per unit time to controllable load CL in the predetermined time slot on the aforementioned predetermined date.

The HEMSs of consumers An and Bn control controllable loads CL so as to consume power in the predetermined time slot on the predetermined date, in accordance with $Y_{An}(t)$ and $Y_{Bn}(t)$ indicated by central server 120.

At this time, central server 120 may modify as appropriate the amount of stored electric (thermal) power per unit time to be assigned to each of controllable loads CL, $Y_{An}(t)+Y_{Bn}(t)$, based on ΣPx(t), the actual measurement of the total amount of electric power that has been generated, and that has been obtained by measuring and adding up the amounts of generated power Px(t) on the predetermined date, notified from the HEMS of consumer An. The amount of stored electric (thermal) power $Y_{An}(t)+Y_{Bn}(t)$ is preferably modified by using a sufficiently short time interval α (e.g., one minute interval) as the unit time.

$Y_{An}(t)+Y_{Bn}(t)$, the amount of stored eclectic (thermal) power per unit time a assigned to each controllable load CL can be conceivably modified in the following method, based on the relationship between ΣPx(t), Σ$Y_{An}(t)$ and Σ$Y_{Bn}(t)$.

(a) In a Case of ΣPx(t)<Σ$Y_{An}(t)$:

In this case, the controllable load CL of consumer An stores the electric power (ΣPx(t)) actually generated by the PV system while no electric power is stored in the controllable load CL of consumer Bn.

The HEMS of consumer An notifies the shortage of electricity to be stored in controllable load CL of consumer An, Σ$Y_{An}(t)$−ΣPx(t) as the shortage of charging $Y_{An-}(t)$, to central server 120. The HEMS of consumer Bn notifies the shortage of electricity to be stored in controllable load CL of consumer Bn, Σ$Y_{Bn}(t)$ as the shortage of charging $Y_{Bn-}(t)$, to central server 120.

(b) In a Case of Σ$Y_{An}(t)$<ΣPx(t)<Σ$Y_{An}(t)$+Σ$Y_{Bn}(t)$:

In this case, the controllable load CL of consumer An stores electricity in accordance with $Y_{An}(t)$, and the controllable load CL of consumer Bn stores electricity of ΣPx(t)−Σ$Y_{An}(t)$.

The HEMS of consumer Bn notifies the shortage of electricity to be stored in controllable load CL of consumer Bn, Σ$Y_{An}(t)$+Σ$Y_{Bn}(t)$−ΣPx(t) as the shortage of charging $Y_{Bn-}(t)$, to central server 120.

(c) In a Case of ΣPx(t)>Σ$Y_{An}(t)$+Σ$Y_{Bn}(t)$:

In this case, the controllable load CL of consumer An stores electricity in accordance with $Y_{An}(t)$, and the controllable load CL of consumer Bn stores electricity in accordance with $Y_{Bn}(t)$.

The HEMS of consumer An notifies the surplus electricity by the PV system, ΣPx(t)−Σ{$Y_{An}(t)+Y_{Bn}(t)$} to central server 120. Central server 120, based on the notice from the HEMS of consumer An, assigns a task of storing the surplus electricity ΣPx(t)−Σ{$Y_{An}(t)+Y_{Bn}(t)$} to the controllable load CL of a consumer that is located nearest to the consumer An in electric power system 100 and that is notified of the shortage of charging $Y_{Bn-}(t)$.

Here, in the electric power system of the present exemplary embodiment, since there are many combinations (consumer clusters) of consumer An and consumer Bn) (such as consumers A1 and B1, consumers A2 and B2, . . . , and the like), if all the consumer clusters perform operations of storing electric (thermal) power to controllable loads at the same time, large imbalance between power supply and demand in unit time a will occur. For this reason, it is preferable that central server 120 mitigate the imbalance between supply and demand by shifting the timing of the operation of storing electrical (thermal) power to the controllable loads CL of each consumer cluster from the others. The shift time of electrical (thermal) storage operation of each consumer cluster may and should be set to be sufficiently shorter, for example, as short as 10 seconds or 1 minute, than the duration (usually 30 minutes) required by the aforementioned rules on balancing the electric power system.

Though the description heretofore of the present exemplary embodiment was given taking an example in which a consumer cluster is formed by combining one consumer An having PV and one consumer Bn having controllable load CL, a consumer cluster may be formed by combining one consumer An with a plurality of consumers Bn or by combining a plurality of consumers An with one consumer Bn.

Further, it is not necessary that the above amount of used electric power $Y_{An}(t)+Y_{Bn}(t)$ and the amount of electric power that is expected to be generated should strictly satisfy the rules on balancing the electric power system at any time. That is, all the surplus electricity that is generated at consumer An does not need to be consumed by consumer Bn. It is sufficient that central server 120 can combine consumers An and Bn appropriately so as not to increase surplus electricity that is generated in all the consumers in each consumer cluster.

According to the electric power system of the present exemplary embodiment, consumer An having a PV system and a consumer Bn having a controllable load CL without a PV system are combined so that the amount of electric power demand of controllable load CL will be equal to or greater than the surplus electricity generated at consumer An, to thereby let the controllable load CL consume the surplus electricity that is generated at consumer An, thus making it possible to mitigate preventing electric power from being generated by the PV system and to prevent reducing surplus electricity that is generated in electric power system 100.

Accordingly, it is possible to provide an electric power system that contributes to solving the problem of surplus electricity in electric power system 100 in which many reusable electric power sources are connected.

This technology shown in the present exemplary embodiment is effective even when consumer An and consumer Bn include a fuel cell which is a controllable device that controls the generation of electricity. On the other hand, as controllable load CL, electric vehicles (EV), plug-in hybrid electric vehicles (PHEV) and the like, including a high-speed charger or normal charger for charging, may be used.

Although the present invention has been explained with reference to the exemplary embodiment, the present invention should not be limited to the above exemplary embodiment. Various modifications that can be understood by those skilled in the art may be made to the structures and details of the present invention within the scope of the present invention.

This application claims priority of Japanese Patent Application No. 2011-018322 filed on Jan. 31, 2011, the disclosures of which are incorporated herein by reference.

The invention claimed is:

1. An electric power management system for managing an electric power system, the electric power management system comprising:
   a plurality of first consumers each comprising a consumer energy management system for controlling an amount of electric power generated by a photovoltaic system, and a plurality of second consumers each comprising a consumer energy management system for controlling a controllable load,
   wherein the controllable load is a device which can store energy,
   wherein the electric power management system comprises a server apparatus that transmits data to the consumer energy management systems of the first consumers and the consumer energy management systems of the second consumers, and that receives data from the consumer energy management systems of the first consumers and the consumer energy management systems of the second consumers via a network, and
   wherein the server apparatus combines two or more consumers from among the plurality of first consumers and the plurality of second consumers so that the amount of electric power needed by a second consumer will be equal to or greater than a surplus electricity generated in a first consumer in a predetermined time slot on a predetermined date on which the surplus electricity of the photovoltaic system is expected to be generated, and makes the controllable load consume the surplus electricity generated in the first consumer by controlling the consumer energy management system of the second consumer with respect to each combination of the first consumer and the second consumer, and makes the controllable load store the surplus electricity generated in the first consumer by controlling the consumer energy management system of the second consumer at different timing with respect to each combination of the first consumer and the second consumer.

2. The electric power management system according to claim 1, wherein the server apparatus sets up a pattern for electric power that is needed for making the controllable load consume electric power during a unit time in the predetermined time slot on the predetermined date, such that the pattern for electric power that is needed for making the controllable load consume the electric power is substantially similar to the pattern of electric power that is expected to be generated by the photovoltaic system in the predetermined time slot on the predetermined date.

3. The electric power management system according to claim 2, wherein the consumer energy management system of the first consumer transmits an actual measurement of the amount of electric power generated by the photovoltaic system, measured in the predetermined time slot on the predetermined date, and,
   the server apparatus, based on the actual measurement of the amount of electric power that is generated, modifies the pattern of electric power that is needed for each unit time, which has been set for the controllable load.

4. The electric power management system according to claim 1, wherein the server apparatus selects the first consumer and the second consumer from among consumers that are connected to same pole transformer.

5. The electric power management system according to claim 1, wherein the server apparatus selects the first consumer and the second consumer from among consumers that are connected to same distribution feeder line.

6. The electric power management system according to claim 1, wherein the server apparatus selects the first consumer and the second consumer from among consumers that are connected to same distribution transformer substation.

7. An electric power management method for managing an electric power system, the method comprising:
   controlling, with consumer energy management systems equipped for each of a plurality of first consumers, an amount of electric power that is generated by a photovoltaic system, and notifying a server apparatus of an amount of surplus electricity that is expected to be generated in a predetermined time slot on a predetermined date on which surplus electricity of the photovoltaic system is expected to be generated;
   controlling a controllable load with consumer energy management systems equipped for each of a plurality of second consumers, and notifying the server apparatus of the amount of electric power that is expected to be needed by the second consumer in the predetermined time slot on the predetermined date; and
   combining, by the server apparatus, two or more consumers from among said plurality of first consumers and said plurality of second consumers so that the amount of electric power needed by a second consumer will be equal to or greater than the amount of surplus electricity generated in a first consumer in the predetermined time slot on the predetermined date, and making the controllable load consume the surplus electricity generated in the first consumer by controlling the consumer energy management system of the second consumer with respect to each combination of the first consumer and the second consumer, and making the controllable load store the surplus electricity generated in the first consumer by controlling the consumer energy management system of the second consumer at different timing with respect to each combination of the first consumer and the second consumer.

8. The electric power management method according to claim 7, further comprising setting up a pattern for electric power that is needed for making the controllable load consume electric power during a unit time in the predetermined time slot on the predetermined date, such that the pattern for electric power that is needed for making the controllable load consume the electric power is substantially similar to the pattern of electric power that is expected to be generated by the photovoltaic system in the predetermined time slot on the predetermined date.

9. The electric power management method according to claim 8, further comprising transmitting an actual measurement of the amount of electric power generated by the photovoltaic system, measured in the predetermined time slot on the predetermined date, and
   modifying, by the server apparatus, based on the actual measurement of the amount of electric power that is generated, the pattern of electric power that is needed for every said unit time, which has been set for the controllable load.

10. A server apparatus for managing an electric power system, the server apparatus comprising:
- a communication control device that receives an amount of surplus electricity that is expected to be generated in a predetermined time slot on a predetermined date on which surplus electricity of a photovoltaic system is expected to be generated, from a plurality of first consumers, and that receives an amount of electric power, that is needed by a plurality of second consumers in the predetermined time slot on the predetermined date, from the second consumers; and
- a processing unit that combines two or more consumers from among the plurality of first consumers and the plurality of second consumers so that the amount of electric power needed by a second consumer will be equal to or greater than an amount of surplus electricity that is generated in a first consumer in the predetermined time slot on the predetermined date, and that makes a controllable load consume the surplus electricity that is generated in the first consumer by controlling a consumer energy management system of the second consumer with respect to each combination of the first consumer and the second consumer, and that makes the controllable load store the surplus electricity that is generated in the first consumer by controlling a consumer energy management system of the second consumer at different timing with respect to each combination of the first consumer and the second consumer.

11. The server apparatus according to claim 10, wherein the processing unit sets up an electric power demand pattern for making the controllable load consume electric power during a unit time in the predetermined time slot on the predetermined date, such that the electric power demand pattern for making the controllable load consume the electric power is substantially similar to an expected pattern of electric power that will be generated by the photovoltaic system in the predetermined time slot on the predetermined date.

12. The server apparatus according to claim 11, wherein, when an actual measurement of the amount of electric power generated by the photovoltaic system, measured in the predetermined time slot on the predetermined date is transmitted from the consumer energy management system of the first consumer, the processing unit, based on the actual measurement of the amount of electric power that is generated, modifies an electric power consumption pattern for each unit time, which has been set for the controllable load.

13. An electric power management method for managing an electric power system, the method comprising:

- receiving, by a server apparatus, an amount of surplus electricity that is expected to be generated in a predetermined time slot on a predetermined date on which surplus electricity of a photovoltaic system is expected to be generated, from a plurality of first consumers;
- receiving an amount of electric power that is needed by a plurality of second consumers each comprising a consumer energy management system in the predetermined time slot on the predetermined date, from the second consumers;
- combining, by the server apparatus, two or more consumers from among the plurality of first consumers and the plurality of second consumers so that the amount of electric power needed by a second consumer will be equal to or greater than an amount of surplus electricity that is generated at a first consumer in the predetermined time slot on the predetermined date;
- making a controllable load consume the surplus electricity that is generated at the first consumer by controlling the consumer energy management system of the second consumer with respect to each combination of the first consumer and the second consumer;
- making the controllable load store the surplus electricity that is generated at the first consumer by controlling the consumer energy management system of the second consumer at different timing with respect to each combination of the first consumer and the second consumer.

14. The electric power management method according to claim 13, further comprising setting up an electric power demand pattern for making the controllable load consume electric power during a unit time in the predetermined time slot on the predetermined date, such that the electric power demand pattern for making the controllable load consume electric power is substantially similar to an expected pattern of electric power that will be generated by the photovoltaic system in the predetermined time slot on the predetermined date.

15. The electric power management method according to claim 14, wherein, when an actual measurement of the amount of electric power generated by the photovoltaic system, measured in the predetermined time slot on the predetermined date is transmitted from the consumer energy management system of the first consumer, modifying, by the server apparatus, based on the actual measurement of the amount of electric power that is generated, an electric power consumption pattern for each unit time, which has been set for the controllable load.

* * * * *